USOO9479769B2

(12) United States Patent
Wright et al.

(10) Patent No.: US 9,479,769 B2
(45) Date of Patent: *Oct. 25, 2016

(54) CALIBRATION OF A SUPER-RESOLUTION DISPLAY

(71) Applicant: Christie Digital Systems USA, Inc., Cypress, CA (US)

(72) Inventors: Kevin Wright, Ontario (CA); Greg Clancy, Ontario (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 14/258,355

(22) Filed: Apr. 22, 2014

(65) Prior Publication Data

US 2014/0226028 A1 Aug. 14, 2014

Related U.S. Application Data

(63) Continuation of application No. 11/339,637, filed on Jan. 26, 2006, now Pat. No. 8,777,418.

(51) Int. Cl.
*H04N 9/31* (2006.01)
*H04N 17/00* (2006.01)
(Continued)

(52) U.S. Cl.
CPC .......... *H04N 17/004* (2013.01); *G03B 21/14* (2013.01); *G03B 37/04* (2013.01); *H04N 5/74* (2013.01); *H04N 9/3147* (2013.01); *H04N 9/3185* (2013.01); *H04N 9/3194* (2013.01)

(58) Field of Classification Search
CPC . H04N 9/3147; H04N 9/3185; H04N 9/3194
USPC ........ 353/30, 31, 32, 33, 34, 35, 36, 37, 48, 353/69, 70, 89, 94, 121, 122; 348/745, 747
See application file for complete search history.

(56) References Cited

U.S. PATENT DOCUMENTS 5,475,447 A * 12/1995 Funado ............... H04N 3/2335
348/745
6,222,593 B1 * 4/2001 Higurashi ............. G03B 37/04
315/368.12

(Continued)

FOREIGN PATENT DOCUMENTS

EP 0498659 A2 8/1992
JP 6-141246 5/1994

(Continued)

OTHER PUBLICATIONS

International Search Report, mailed May 15, 2007 and issued in corresponding International Patent Application No. PCT/CA2007/000095.

(Continued)

*Primary Examiner* — Bao-Luan Le
(74) *Attorney, Agent, or Firm* — Staas & Halsey LLP

(57) ABSTRACT

A projector system includes an image generator and at least one projector for receiving an image from the image generator and projecting the image onto a screen to provide a final projected image. A computer generates correction data based on a calibration process that includes comparing an uncorrected image projected by the at least one projectors with a geometrically correct image. Wherein the at least one projector maps incoming pixel locations from the image generator to corrected pixel locations in the final projected image based on the correction data.

18 Claims, 11 Drawing Sheets

(51) Int. Cl.
*G03B 21/14* (2006.01)
*H04N 5/74* (2006.01)
*G03B 37/04* (2006.01)

(56) References Cited

U.S. PATENT DOCUMENTS

| | | | | |
|---|---|---|---|---|
| 6,456,339 | B1* | 9/2002 | Surati | G03B 37/04 348/744 |
| 6,471,355 | B1* | 10/2002 | Monson | G03B 21/13 348/383 |
| 6,558,006 | B2* | 5/2003 | Ioka | G03B 21/13 348/E9.027 |
| 6,570,623 | B1 | 5/2003 | Li et al. | |
| 6,733,138 | B2 | 5/2004 | Raskar | |
| 6,755,537 | B1 | 6/2004 | Raskar et al. | |
| 6,760,075 | B2 | 7/2004 | Mayer, III et al. | |
| 6,804,406 | B1 | 10/2004 | Chen | |
| 7,114,813 | B2 | 10/2006 | Wada et al. | |
| 7,215,362 | B2 | 5/2007 | Klose | |
| 7,306,341 | B2* | 12/2007 | Chang | G03B 37/04 353/11 |
| 2002/0008675 | A1 | 1/2002 | Mayer et al. | |
| 2002/0024640 | A1* | 2/2002 | Ioka | G03B 21/13 353/94 |
| 2003/0128337 | A1 | 7/2003 | Jaynes et al. | |
| 2004/0085256 | A1* | 5/2004 | Hereld | H04N 9/12 345/1.1 |
| 2004/0085477 | A1 | 5/2004 | Majumder et al. | |
| 2004/0140981 | A1 | 7/2004 | Clark | |
| 2004/0155965 | A1 | 8/2004 | Jaynes et al. | |
| 2004/0239884 | A1 | 12/2004 | Nagashima et al. | |
| 2005/0206857 | A1* | 9/2005 | Yamada | G03B 21/56 353/94 |
| 2005/0271299 | A1 | 12/2005 | Ajito et al. | |
| 2006/0146295 | A1 | 7/2006 | Harboe | |
| 2006/0192925 | A1 | 8/2006 | Chang | |
| 2007/0273837 | A1 | 11/2007 | Furui | |

FOREIGN PATENT DOCUMENTS

| | | |
|---|---|---|
| JP | 9-326981 | 12/1997 |
| JP | 2002-116749 | 4/2002 |
| JP | 2003-524915 | 8/2003 |
| JP | 2003-348500 | 12/2003 |
| JP | 2004-507987 | 3/2004 |
| WO | 99/31877 | 6/1999 |
| WO | 00/07376 | 2/2000 |
| WO | 02/19704 | 3/2002 |
| WO | 02/19704 A2 | 3/2002 |

OTHER PUBLICATIONS

R.K. Lenz et al., "Techniques for Calibration of the Scale Factor and Image Center for High Accuracy 3D Machine Vision Metrology".

Paul Lyon et al. "A Self-Aligning CRT Projection System with Digital Correction", Evans & Sutherford Computer Corp., Salt Lake City, Utah.

Richard E. Holmes, "Common Projector and Display Modules for Aircraft Simulator Visual System", Electronic Image Systems, Inc., Xena, Ohio.

Rajeev J. Surati, Scalable Self-Calibrating Display Technology for Seamless Large-Scale Displays, Department of Electrical Engineering and Computer Science: Massachusetts Institute of Technology; http://groups.csail.mit.edu/mac/users/raj/ScalableSeamless.pdf, pp. 1-67, 1999.

Annotated version of portion of Rajeev J. Surati, Scalable Self-Calibrating Display Technology for Seamless Large-Scale Displays, Department of Electrical Engineering and Computer Science: Massachusetts Institute of Technology; http://groups.csail.mit.edu/mac/users/raj/ScalableSeamless.pdf, pp. 1-67, 1999. (pp. 47-51).

English Translation of Japanese Office Action dated Mar. 27, 2012 issued in corresponding Japanese Patent Application No. 2008-551608.

Extended European Search Report dated Jun. 6, 2012 issued in corresponding European Patent Application No. 07701719.2.

English Translation of Japanese Office Action issued Sep. 4, 2012 in corresponding Japanese Patent Application No. 2008-551608.

European Office Action mailed Apr. 18, 2013 for corresponding European Application No. 07701719.2.

Japanese Office Action mailed Jan. 14, 2014 in corresponding Japanese Application No. 2013-10789.

U.S. Office Action mailed Sep. 3, 2008 in corresponding U.S. Appl. No. 11/339,637.

U.S. Office Action mailed Mar. 2, 2009 in corresponding U.S. Appl. No. 11/339,637.

U.S. Office Action mailed May 27, 2009 in corresponding U.S. Appl. No. 11/339,637.

U.S. Office Action mailed Aug. 5, 2009 in corresponding U.S. Appl. No. 11/339,637.

U.S. Office Action mailed Mar. 5, 2010 in corresponding U.S. Appl. No. 11/339,637.

U.S. Office Action mailed Oct. 27, 2010 in corresponding U.S. Appl. No. 11/339,637.

U.S. Office Action mailed Apr. 12, 2011 in corresponding U.S. Appl. No. 11/339,637.

U.S. Office Action mailed Jun. 13, 2011 in corresponding U.S. Appl. No. 11/339,637.

U.S. Office Action mailed Sep. 19, 2011 in corresponding U.S. Appl. No. 11/339,637.

U.S. Office Action mailed Jan. 31, 2012 in corresponding U.S. Appl. No. 11/339,637.

U.S. Office Action mailed Aug. 19, 2013 in corresponding U.S. Appl. No. 11/339,637.

U.S. Notice of Allowance mailed Jan. 17, 2014 in corresponding U.S. Appl. No. 11/339,637.

U.S. Appl. No. 11/339,637, filed Jan. 26, 2006, Kevin Wright, Christie Digital Systems USA, Inc.

* cited by examiner

CALIBRATION OF A SUPER-RESOLUTION DISPLAY

CROSS REFERENCE TO RELATED APPLICATIONS

This application is a continuation of U.S. application Ser. No. 11/339,637, filed Jan. 26, 2006, the disclosure of which is incorporated herein by reference.

FIELD OF THE INVENTION

The present invention relates to calibration of a super-resolution display, in particular, a calibration method including geometry correction and color, intensity, brightness and uniformity matching.

BACKGROUND OF THE INVENTION

It is common in the projection industry to combine multiple overlapping displays from different projectors to produce arbitrarily large and irregularly shaped displays. Such displays are typically used in immersive environments and large venues such as amphitheaters and shopping malls. The process of aligning and matching the projectors is a difficult and time-consuming task, which is typically performed by an experienced installer. If the aligning and matching process is not done properly, an unsatisfactory image such as FIG. 1a may be the result. Each projector image must align exactly to the pixel with its neighbors in order to produce an acceptable image such as FIG. 1b. In the overlapping region, where more than one projector is projecting, the brightness levels of each projector must be controlled to achieve a continuous image. Also, the colors of each projector should closely match in order to maintain the illusion of one continuous image.

U.S. Pat. No. 6,456,339 to Surati et al. and U.S. Pat. No. 6,222,593 to Higurashi et al. disclose the use of cameras and image processing to simplify the aligning and matching process of the projectors. In general, these methods involve using information regarding the display from a camera to program a "smart" image generator. The "smart" image generator provides modified images with altered geometry, color and brightness that are fed to a projector to produce a seamless geometrically correct image. The "smart" image generator, however, is limited to the capabilities of the calibration system rather than the capabilities of the projector. By requiring all of the content to pass through the "smart" image generator, latency may be introduced and the available content may be restricted. As such, a lower resolution display may result due to the maximum resolution of the calibration system being lower than that of the original image.

SUMMARY OF THE INVENTION

In one aspect of the present invention there is provided a calibration system for a single or multiple projector system. The calibration system generates geometry calibration data that allows the projector system to receive an image from an image generator and map incoming pixel locations to geometrically corrected outgoing pixel locations that are projected onto a screen. The geometry calibration data is determined through an iterative process in which a camera captures a screen image of a matrix of projected reference markers. The locations of the reference markers in the screen image are compared with target reference marker locations that are stored in a computer. New estimated locations for the projected reference markers are calculated and the process is repeated until the reference markers captured by the camera are located within an acceptable distance of the target reference markers.

In another aspect of the present invention there is provided a calibration system for an image producing device. The calibration system includes a camera for capturing a screen image provided on a display, the screen image being provided by an image producing device receiving image information from an image generator and a computer for performing a calibration process, the calibration process including comparing the captured image with a geometrically correct image and generating calibration data for mapping the image onto the geometrically correct image. Wherein the calibration system is independent of the image producing device and the image generator.

BRIEF DESCRIPTION OF THE DRAWINGS

The invention will be better understood with reference to the following Figures in which like numerals denote like parts and in which.

DETAILED DESCRIPTION OF THE PREFERRED EMBODIMENTS

Figure 1A:
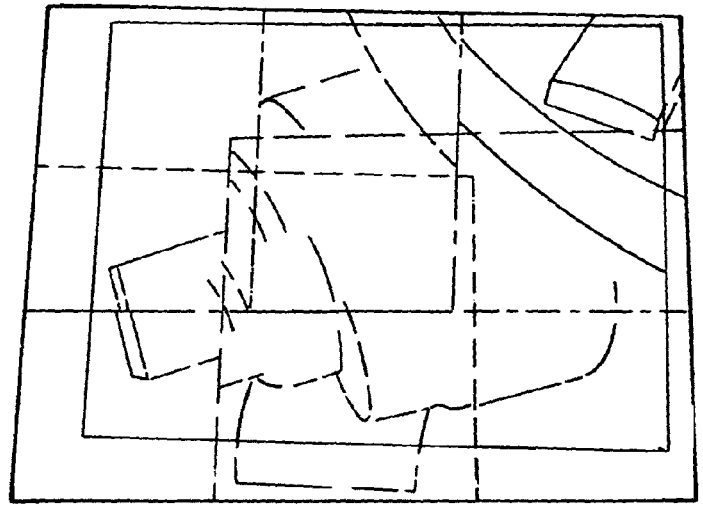
FIG. 1a is an image generated by an uncalibrated multiple projector system.
Figure 1B:
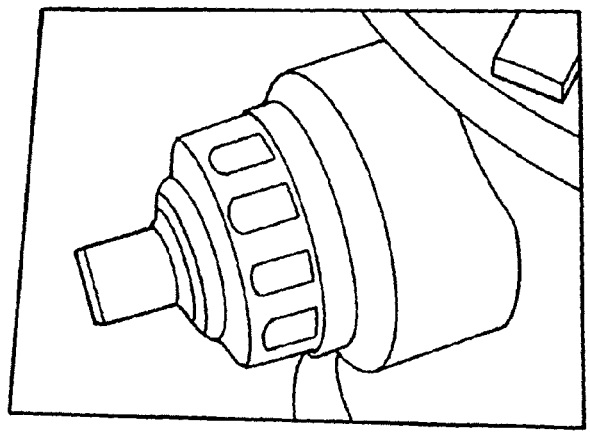
FIG. 1b is an image generated by a calibrated multiple projector system.

FIG. 1a is an example of an image generated by an uncalibrated multiple projector system. The multiple projector system includes four projectors that project individual images. Because the multiple projector system is not properly calibrated, the image in FIG. 1a appears jumbled. FIG. 1b shows the same image as FIG. 1a, however, the image is projected from a multiple projector system that has been calibrated. As shown, the seams between the individually projected images are undetectable.

Figure 2:
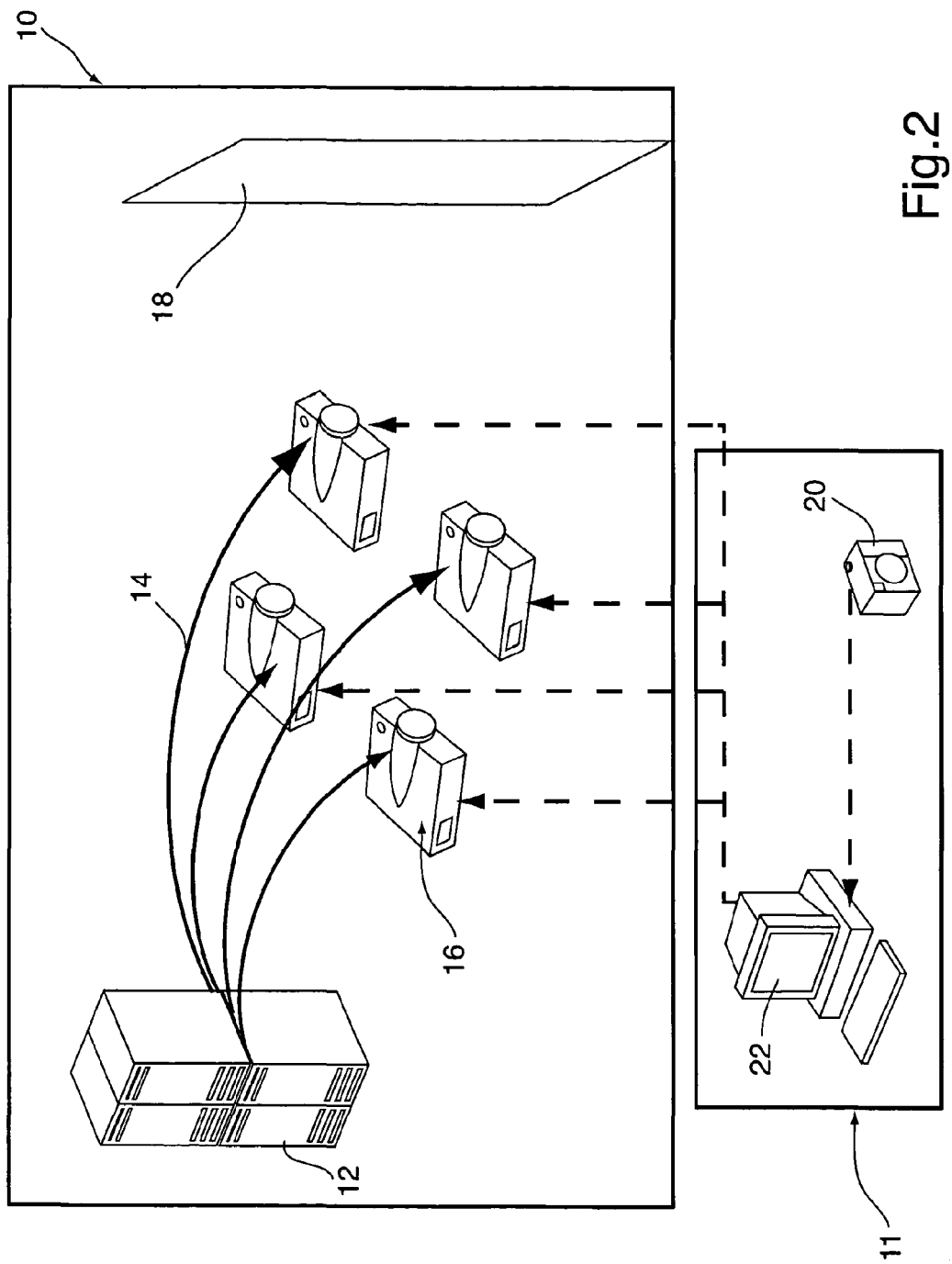
FIG. 2 is a schematic diagram of a multiple projector system according to the present invention.

Referring now to FIG. 2, a multiple projector system 10 and a calibration system 11 are generally shown. The system 10 includes four projectors 16 that receive image information from an image generator 12 through respective video feed lines 14. Each projector 16 displays a portion of an image (not shown) on a display screen 18. The calibration system 11 includes a camera 20, which is provided to capture an image of the display screen 18, and a calibration controller 22 that communicates with both the camera 20 and the projectors 16. The calibration controller 22 is generally a computer that generates calibration data based on a reference image, which is stored in memory, and digital images of the display screen 18 that are sent from the camera 20. The calibration controller 22 adjusts the individual image processing characteristics of each projector 16 in accordance with the calibration data in order to produce a geometrically correct image on the display screen 18.

Each projector 16 includes a warping system that is individually capable of color modification and geometry manipulation. The Matrix series of projectors from Christie Digital Systems may be used or any other suitable warp-capable projector. The image generator 12 is an unaltered multi-display image generator, such as SGI ONYX or Evans and Sutherland EPX System, for example.

Figure 3:
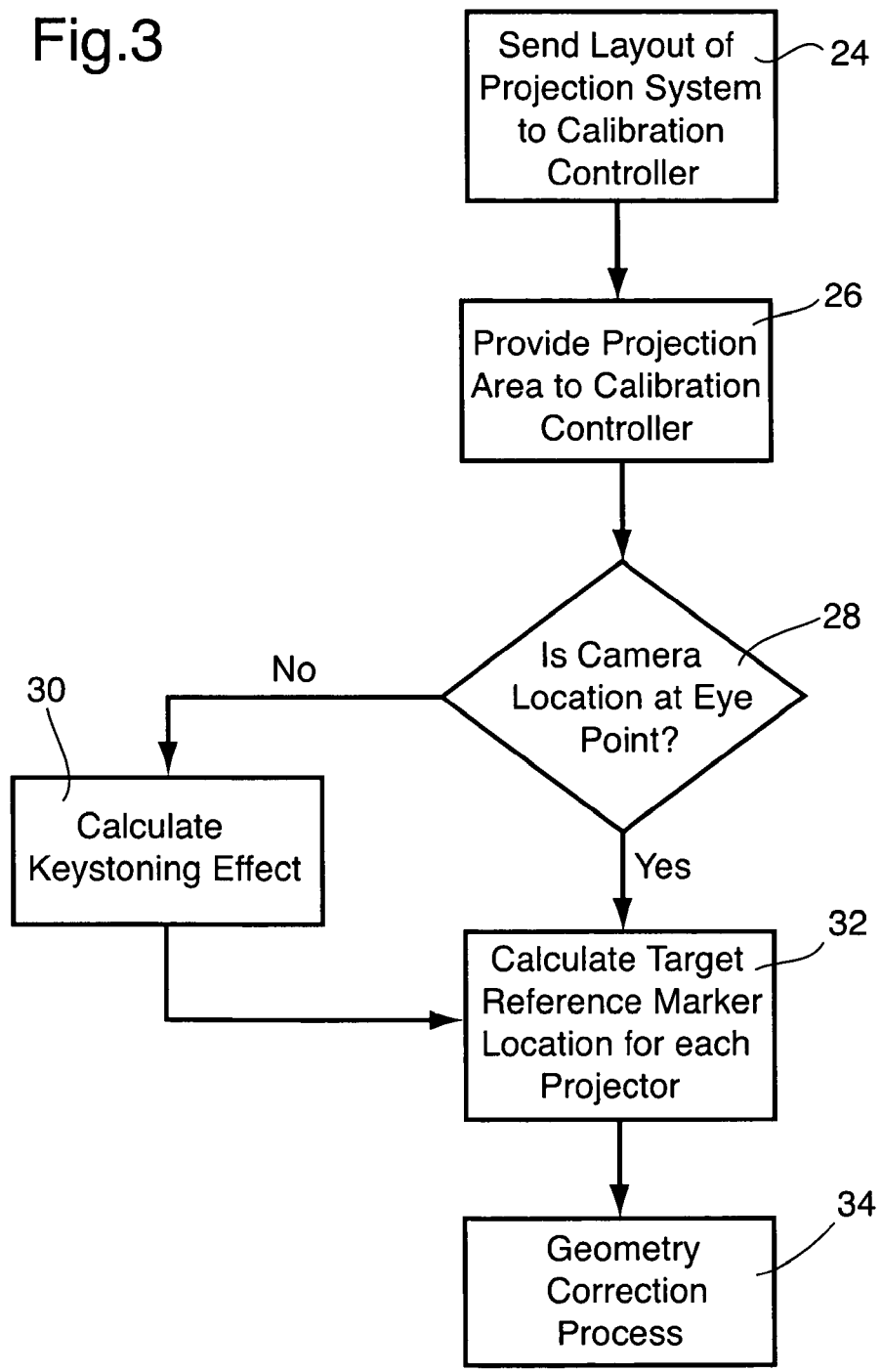
FIG. 3 is a flowchart showing an embodiment of a calibration process for the multiple projector system of FIG. 2.
Figure 4:
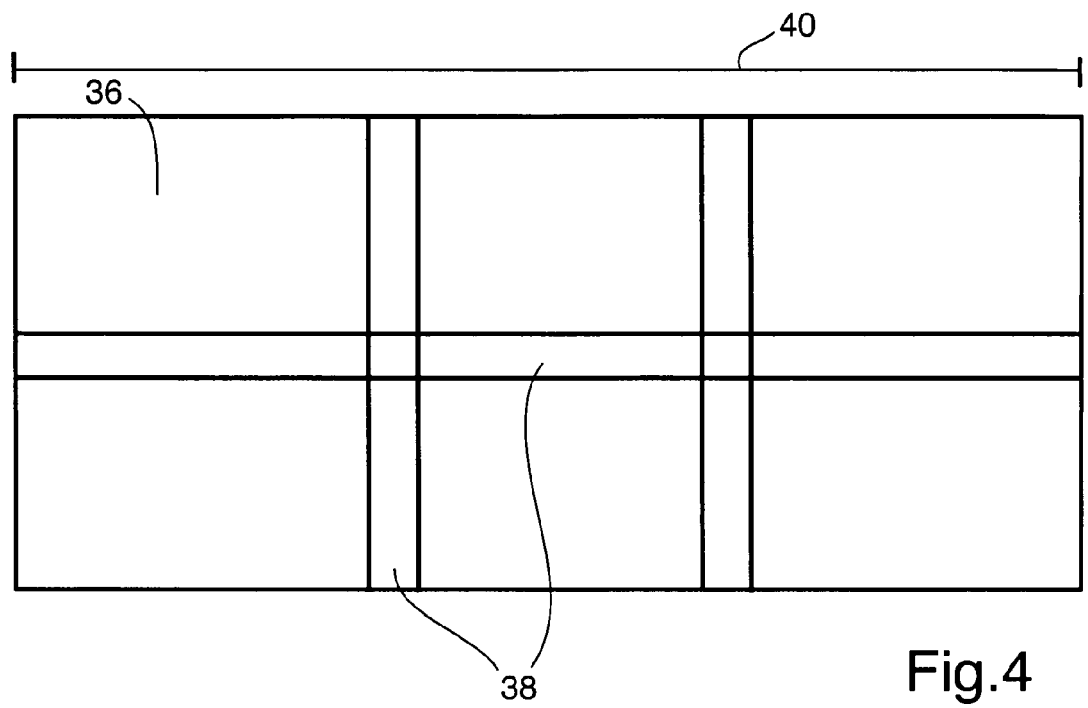
FIG. 4 is a front view of a display screen showing overlap between projector images.

Referring to FIG. 3, a flowchart of a geometric calibration process for the multiple projector system 10 is shown. The embodiment shown in FIG. 3 is for use with a generally planar display screen 18. At block 24, the layout of the projection system 10 is sent from the image generator 12 to the calibration controller 22, as discussed in detail below. The layout of the multiple projector system 10 includes the total image resolution, which is measured in pixels, and the amount of overlap at the intersection of every horizontally and vertically adjacent projector 16. For example, an image produced by a six projector system is shown in FIG. 4. The image is made up of six single projector areas 36 that overlap one another at overlap areas 38. The image has a total image resolution that is indicated by reference numeral 40.

The layout of the projection system 10 is obtained from the image generator 12, which stores the information in order to properly divide the image into multiple video feeds. The information is provided directly to the calibration controller 22 by the image generator 12 through a cable (not shown) or through a wireless link. Alternatively, the layout of the projection system 10 may be entered directly into the calibration controller 22 by a user.

At block 26, the projection area of the display screen 18 on which the final image is to appear is provided to the calibration controller 22. This area can be entered directly into the calibration controller 22 by the user. Alternatively, if there are obvious physical delimiters at the edges of the projection area, the calibration controller 22 may generate this area automatically.

Figure 5:
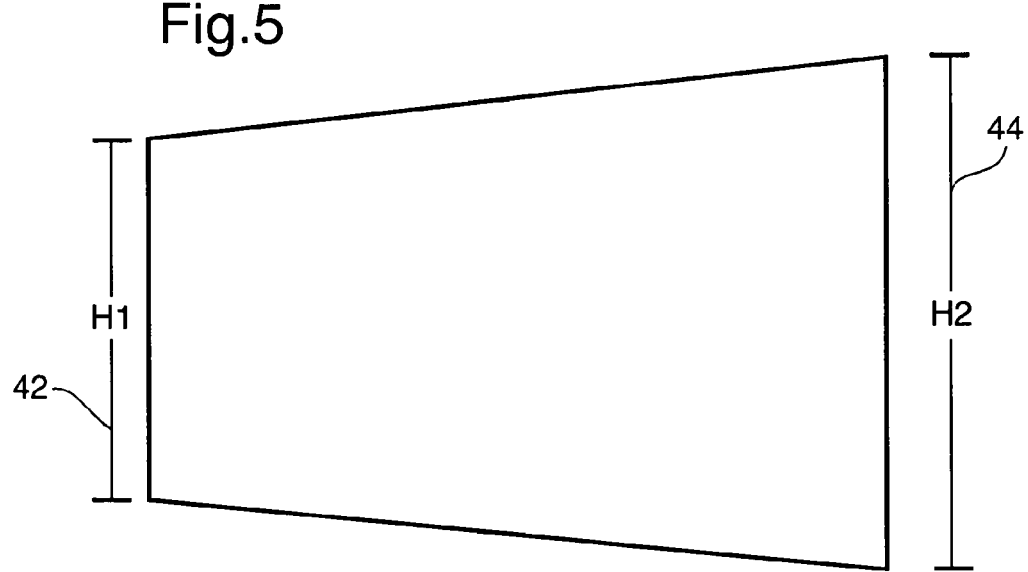
FIG. 5 is a view of a display screen from a non-centered eye point.

Camera 20 may be located at the eye point of the display screen 18, which is generally the location that a viewer is expected to occupy during a presentation, or alternatively, may be located elsewhere as indicated by decision block 28. If camera 20 is not located at the eye point, the orientation of the camera is determined, as indicated at step 30, in order to correct for distortion caused by the camera position. The geometry distortion caused by the camera not being located at the eye point is referred to as a keystoning effect. An example of the keystoning effect is shown in FIG. 5 in which a first vertical boundary 42 of a rectangular projection area appears to be significantly shorter than a second vertical boundary 44 of similar length. Camera orientation and position is generally determined by taking a number of key reference points for which both the actual position and the position in the camera image is known. The number of reference points used is typically three and the reference points often correspond to corners of the projection area. Using the three reference points, the orientation of a viewing plane, which is defined as the plane having a normal equal to the orientation vector of the camera 20, is determined. Alternatively, the orientation of the camera 20 may be specified by the user directly. With the camera position and orientation known, target points can be projected onto the viewing plane of the projector to compensate for the keystoning caused by the displacement of the camera.

When camera 20 is located at or near the eye point, the multiple projector system 10 automatically compensates for distortions in the geometry without requiring a definition of the distortion. Distortions include bumps or irregularities, for example, or any differences between the actual screen geometry and the defined screen geometry.

At block 32, target reference marker locations are calculated using the camera orientation information and the projection area. For each projector 16, the target reference markers form an evenly spaced matrix across a projection field, which is generally defined as the portion of the final image that is projected by each respective projector 16.

Figure 6:
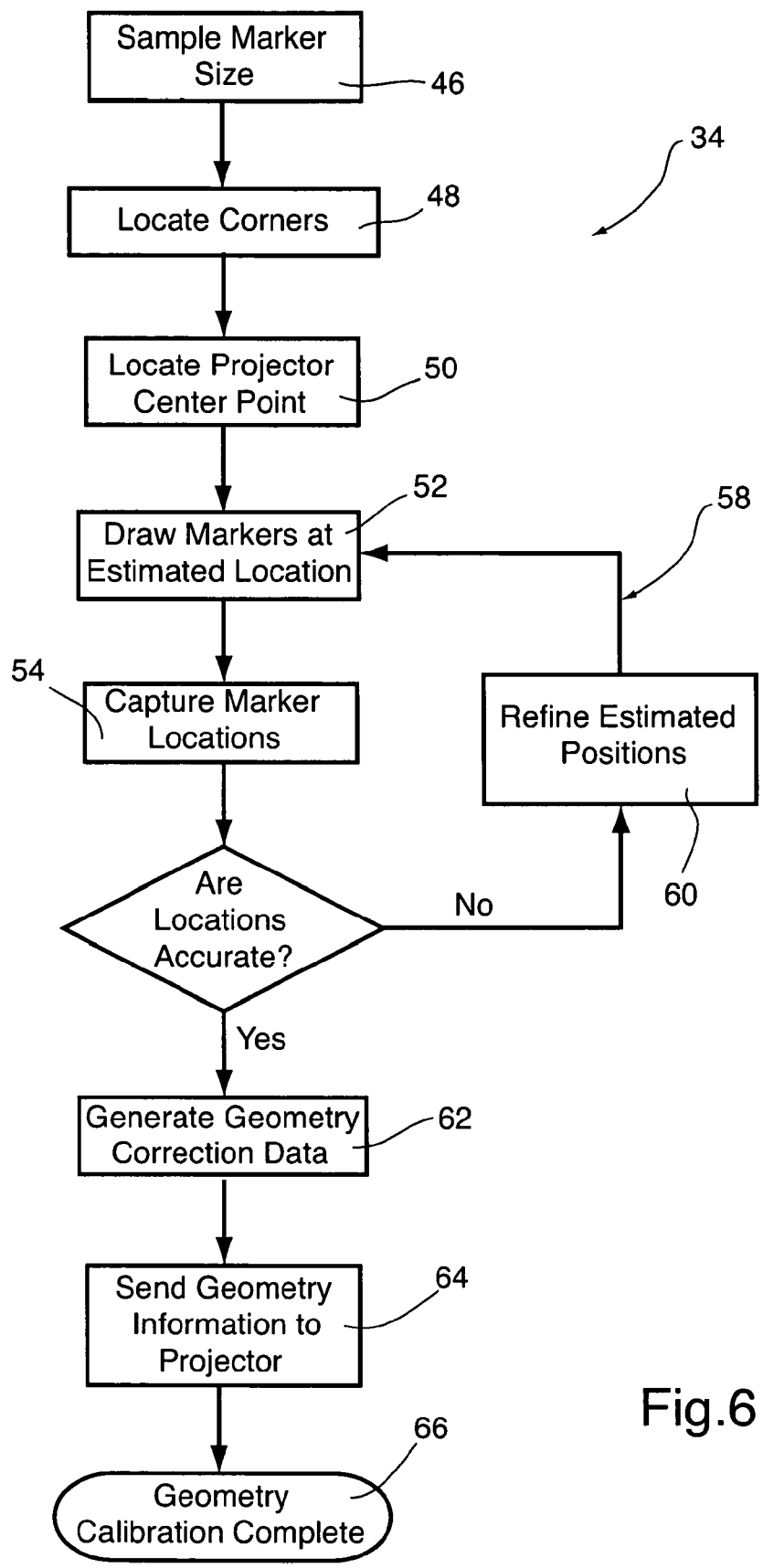
FIG. 6 is a flowchart showing the geometry correction process of FIG. 3.

Once the reference marker locations have been established, the geometry correction process 34, which is shown in FIG. 6, is performed. The geometry correction process 34 is performed for each projector 16, in sequence. At block 46, the size of a single marker in camera space is determined by projecting a reference marker at the center of the projection field of the projector 16 and taking an image of the reference marker. The marker size is dependent on several factors including the distance from the projector 16 to the display screen 18, the type of lens mounted on the projector 16 and the relative image resolutions of the projector 16 and camera 20. In addition to being used in the calibration process, the marker size is also used in later images to filter noise from the image.

At block 48, the pixels in the camera image that correspond to the corners of the projection area are determined. The corresponding pixels may be determined by the user and input to the calibration controller 22, or the corresponding pixels may be determined automatically by the calibration controller 22. In order for the pixels to be determined automatically by the calibration controller 22, the corner areas should be clearly identifiable in the image, for example, a black border surrounding the screen.

Once the marker size has been established and the corners located, the center of the projector 16 is located, as indicated at block 50. The center of the projector 16 is not necessarily the center of the projection area in which the final image will be presented since the overshoot of the projectors may not be symmetric.

At block 52, the projector center point is used to generate an initial position for a matrix of reference markers to be projected onto the display screen 18 by the projector 16.

An image is captured by camera 20 of the initial position of the markers on the display screen 18, as indicated at block 54. At block 56, the image is processed by the calibration controller 22 and the reference marker locations are compared to the target reference marker locations, which were determined at step 32 of FIG. 3. If the distance between the reference markers and the respective target reference markers is greater than an acceptable distance, a feedback loop 58 is entered and at block 60, new reference marker positions are calculated. The new reference marker positions are projected onto the display screen 18 at block 52 and another image is taken by camera 20 at block 54. The new reference marker locations are then compared to the target reference marker locations at block 56. The iterative process of feedback loop 58 continues until the distance between the reference markers and the target reference markers is acceptable and final reference marker locations are established. The acceptable distance is typically a projector pixel, however, this distance may be adjusted by the user.

The final reference marker locations are used to produce a lookup table that is sent to each projector 16, as indicated at block 64. The lookup table is generally a reverse map that maps output pixels to input pixels. For example, for pixel (4, 10) in the final image, the lookup table defines which pixel on the image incoming from the image generator 12 is to be displayed at that point. The reverse map is generated directly from the reference marker locations. Alternatively, the reference marker locations may be used to generate a forward map that maps input pixels to output pixels, which in turn may be used to generate a reverse map by interpolating through the forward map. A forward map is generally easier to read and understand than a reverse map. Therefore, the forward map may be more desirable if the user wishes to make modifications to the geometry manipulation.

At block 66, the geometry calibration process for the first projector 16 is complete. For an embodiment having a single projector 16, the geometry calibration process is complete. For the multiple projector system 10 of FIG. 2, the calibration process is then performed for each remaining projector 16. Once all of the projectors 16 have been calibrated, the multiple protection system 10 is ready to receive images from the image generator 12 and project them onto display screen 18 so that they appear geometrically correct to an audience.

It will be appreciated by a person skilled in the art that the accuracy of the initial estimate for the location of the matrix of reference markers to be projected onto the display screen 18 by each projector 16 does not affect the quality of the final result. However, the more accurate the initial estimate, the more quickly the system 10 will converge on the target locations.

Figure 7:
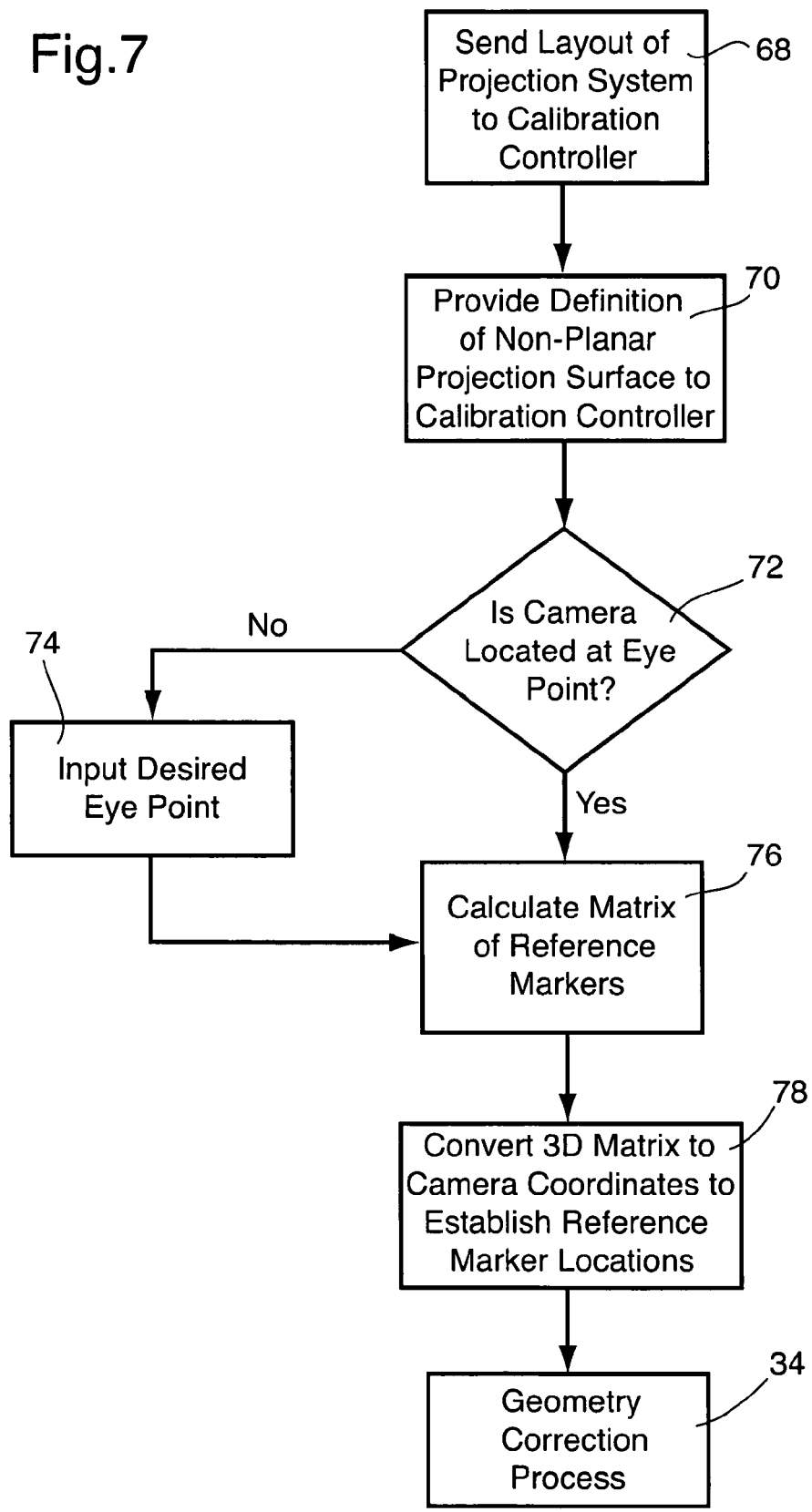
FIG. 7 is a flowchart showing another embodiment of a calibration process for the multiple projector system of FIG. 2.

Referring to FIG. 7, a block diagram of an embodiment of the multiple projector system 10 for use with non-planar display screens 18 is shown. At block 68, the layout of the projection system 10 is sent to the calibration controller 22. At block 70, a definition of the non-planar projection surface is provided to the calibration controller 22. The projection surface may be defined by an equation, an explicit discrete surface file or another suitable type of surface definition.

At decision block 72 the location of the camera 20 is determined. If the camera 20 is not located at the eye point, a desired eye point is provided to the calibration controller 22 at block 74. The matrix of reference markers is calculated at block 76. Using the definition of the non-planar projection surface and the desired eye point, the system 10 is able to determine, in three dimensions, where the matrix of markers should appear on the display screen 18. At block 78, the three dimensional reference markers are then projected onto the viewing plane of the camera 20 and converted into camera coordinates. The previously described geometry correction process 34 may then be performed.

Because the system is iterative, some distortions in the geometry of a non-planar projection area will automatically be compensated for, such as imperfections in a simple or compound curved screen, for example. It will be appreciated by a person skilled in the art that as the irregularity of the surface increases, the resolution of matrix markers should also increase in order to produce adequate results.

In order to produce a final image on the display screen 18 that is not only geometrically correct but also appears seamless, the projectors 16 perform color correction on the incoming pixels. For proper color correction between multiple overlapping projectors 16, brightness and uniformity, color and gamma should be all be matched. A color calibration process, which is described in relation to FIGS. 8, 9 and 10, is performed by the calibration controller 22 to calculate corrected color values for each projector 16.

Figure 8:
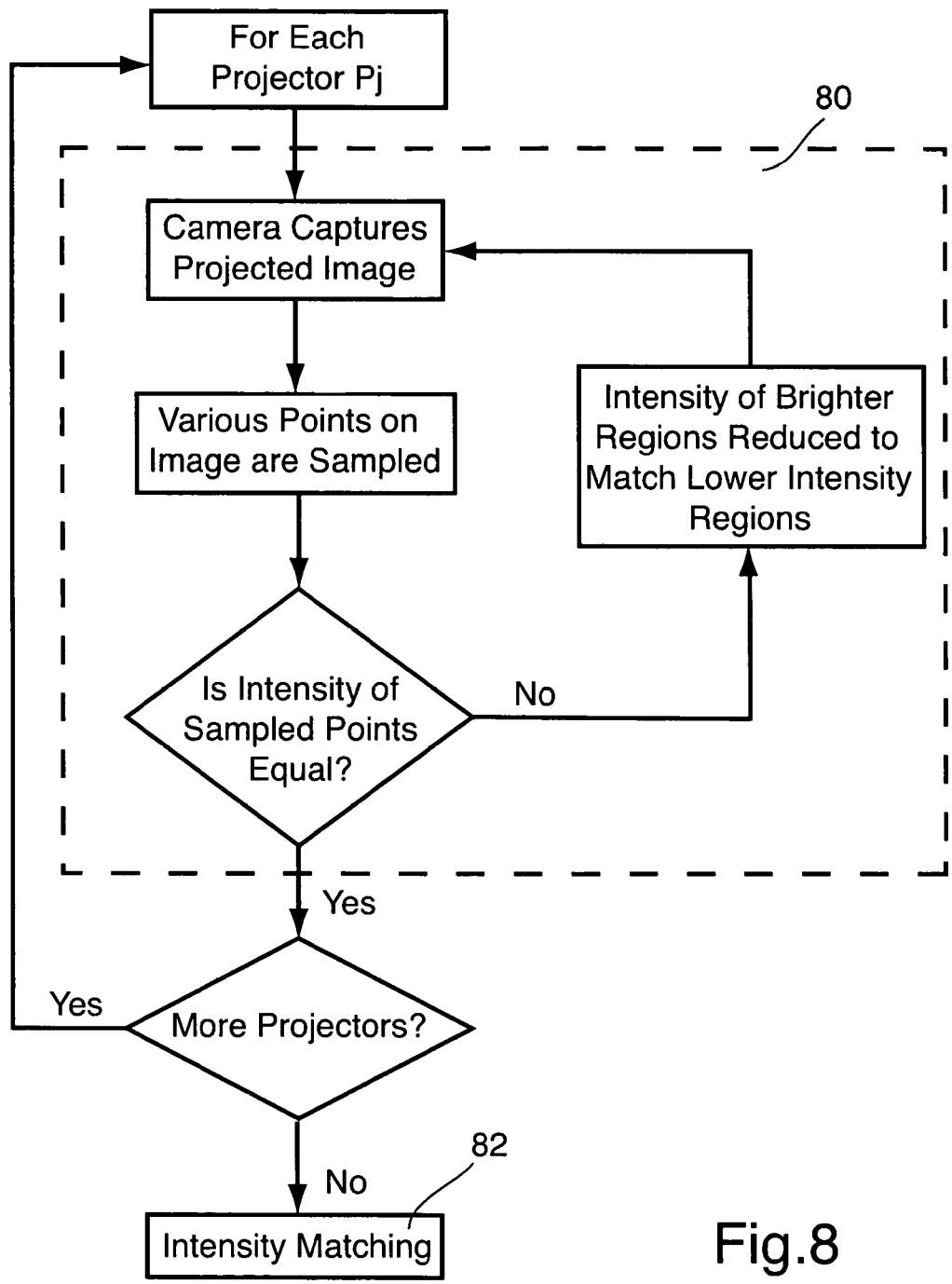
FIG. 8 is a flowchart showing a brightness and intensity matching process for the multiple projector system of FIG. 2.
Figure 9:
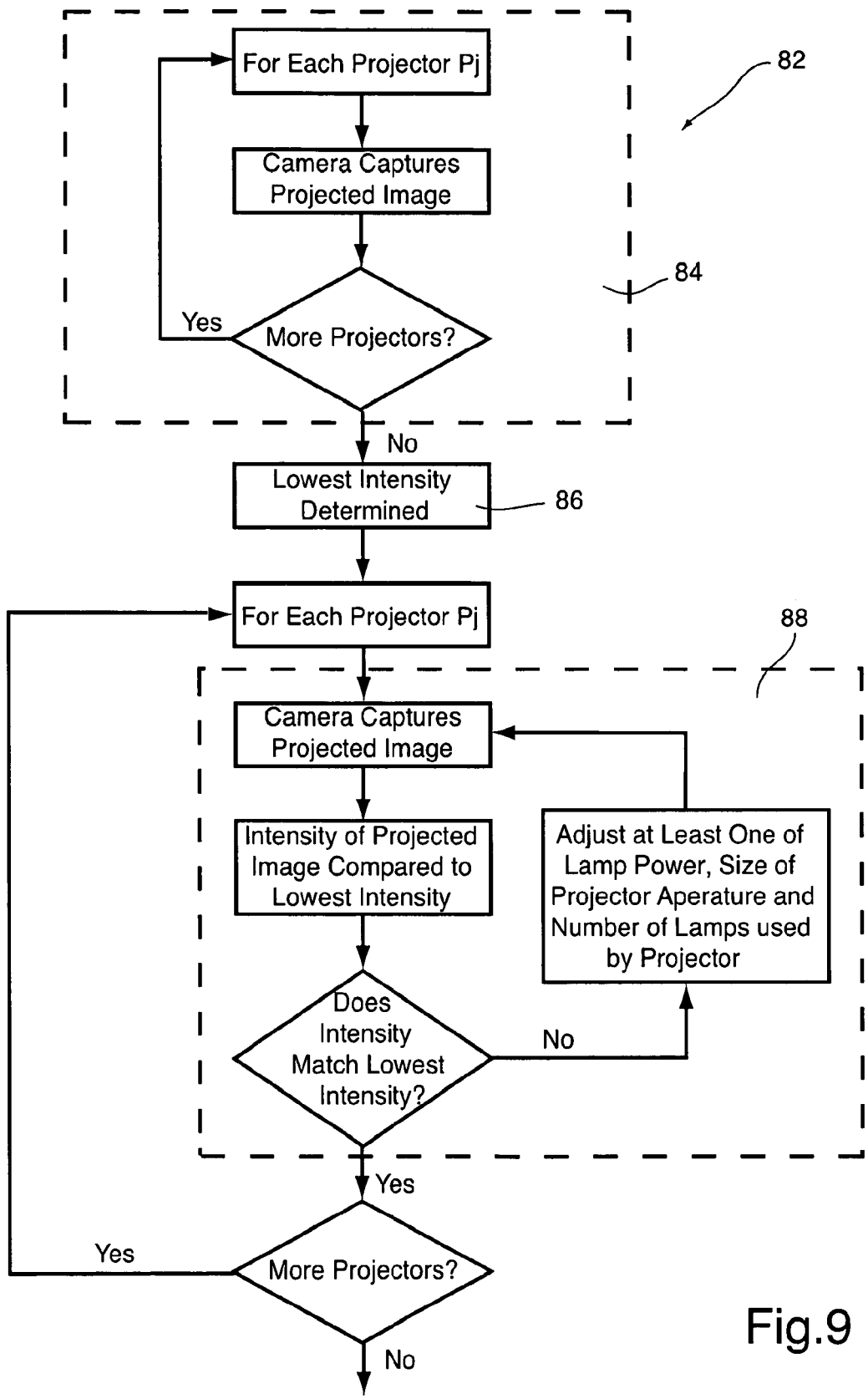
FIG. 9 is a flowchart showing a uniformity matching process for the multiple projector system of FIG. 2.
Figure 10:
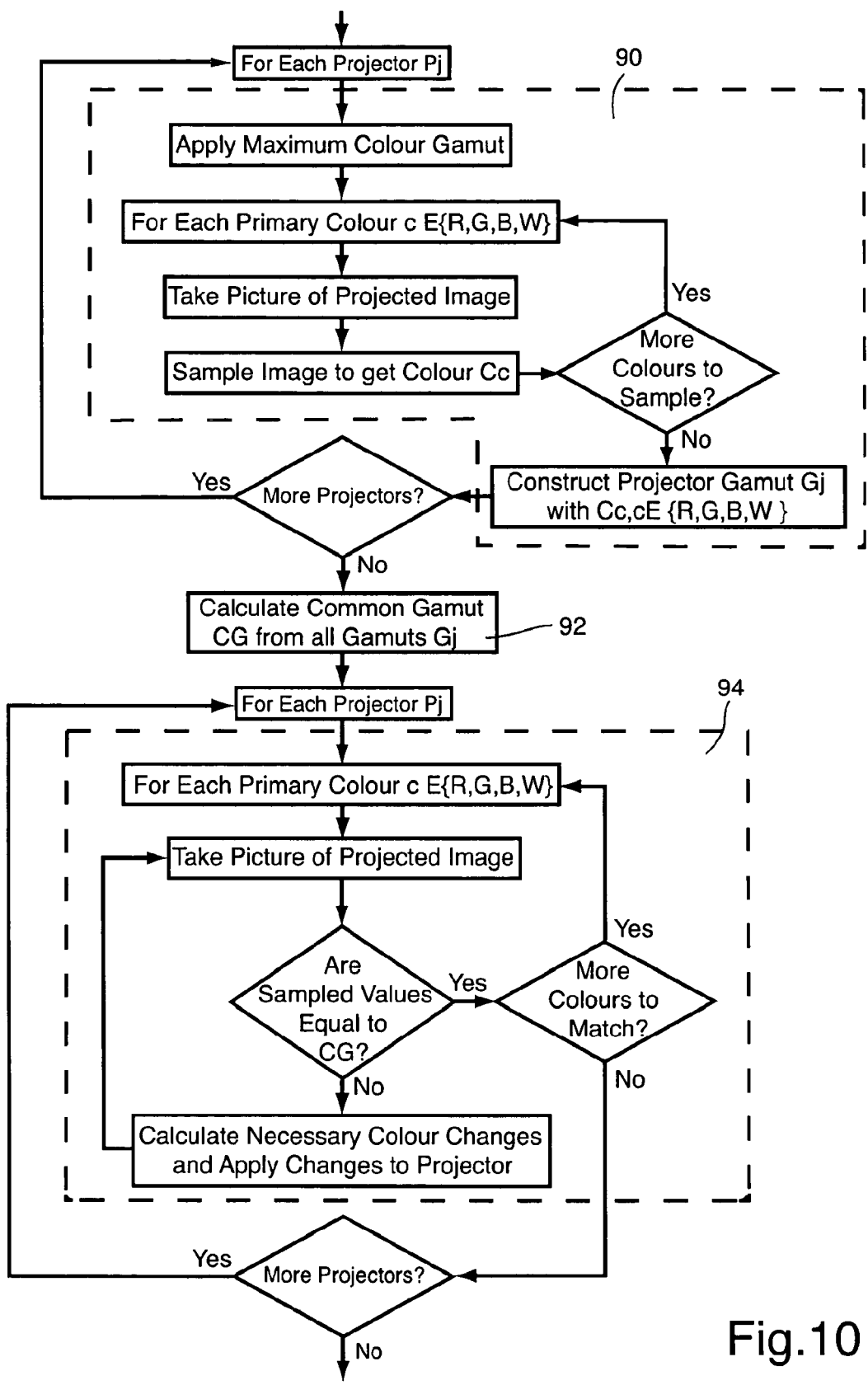
FIG. 10 is a flowchart showing a color matching process for the multiple projector system of FIG. 2.

Brightness and uniformity matching is performed in two phases as shown in FIGS. 8 and 9, respectively. In the first phase, an iterative uniformity matching process 80 is performed for each projector 16. Camera 20 captures the projected image and various points on the image are sampled by the calibration controller 22. The intensity of the sampled points is then compared. If the intensity is not equal across the points, or within a predetermined threshold, the intensity of the brighter regions is reduced to match the lowest intensity. The process 80 is repeated until the brightness is generally uniform across the projector's image. Once all of the projectors 16 have undergone the uniformity matching process 80, intensity matching 82 is performed.

In the second phase, the intensity matching process 82 is performed for each projector 16. An intensity value of each projector 16 is sampled by the camera 20, as indicated by reference numeral 84, and the projector 16 having the lowest intensity is determined, as indicated at block 86. Sampling generally consists of capturing an image of an area covering a portion of the projected image with the camera 20, and sampling and averaging numerous values from the image captured. An iterative process 88 is then performed to reduce the intensities of each projector 16 to match the lowest intensity level. Projector lamp power, projector aperture and the number of lamps used by the projector are iteratively re-sampled and adjusted. Specifically, projector lamp power is adjusted first, followed by projector aperture. If adjustment of these variables is insufficient, the variables are restored to their default values and one of the lamps in a multiple lamp projector is turned off. The process is then restarted by adjusting projector lamp power.

It will be appreciated that the first phase may be bypassed if the projector 16 has uniform brightness across its projection field.

Matching the color between projectors 16 is also performed in two phases. In the first phase, a common color gamut is calculated and in the second phase all projectors 16 are matched to this gamut. A projector's color gamut is the range of possible colors it is able to produce. Gamuts are commonly represented as areas in a CIE 1931 chromaticity diagram. A common color gamut is a gamut that can be achieved by all projectors in the multiple projector system 10.

Referring to FIG. 10, a color gamut determining process 90 is performed for each projector 16. The projector 16 is first set to the maximum color gamut that it can produce. The camera 20 then samples points on the projected image for each primary color (red, green, blue) and averages the sampled values to calculate a color gamut in camera space. A common color gamut is then calculated using the color gamut information obtained from each projector 16, as indicated at block 92.

An iterative color gamut matching process 94 is then performed. For each primary color, the projected image is captured and sampled values are compared to the common color gamut. If the sampled values are not equal to corresponding values on the common color gamut, a color change is calculated and applied to projector 16. This process 94 is repeated until the sampled values are equal to, or within a predetermined threshold, of the common color gamut.

For gamma matching, a gradient test pattern in which a number of bars ranging in color from white, or a primary color, to black, is used. First, one projector of the multiple projector system 10 is selected as the baseline projector. Each bar in a test pattern of the baseline projector is then sampled and compared to corresponding bars on each of the other projectors 16. The gamma values of the other projectors are then adjusted until the brightness of each bar in the test pattern falls within a certain tolerance of the baseline projector brightness. In order for each particular bar to be properly exposed so that the camera 20 is able to differentiate between adjacent bars on the test pattern, the exposure time and aperture settings on the camera 20 may be adjusted. Available color depth for the camera 20 and number of gradient bars in the test pattern generally determine whether or not camera adjustments will be required.

Figure 11:
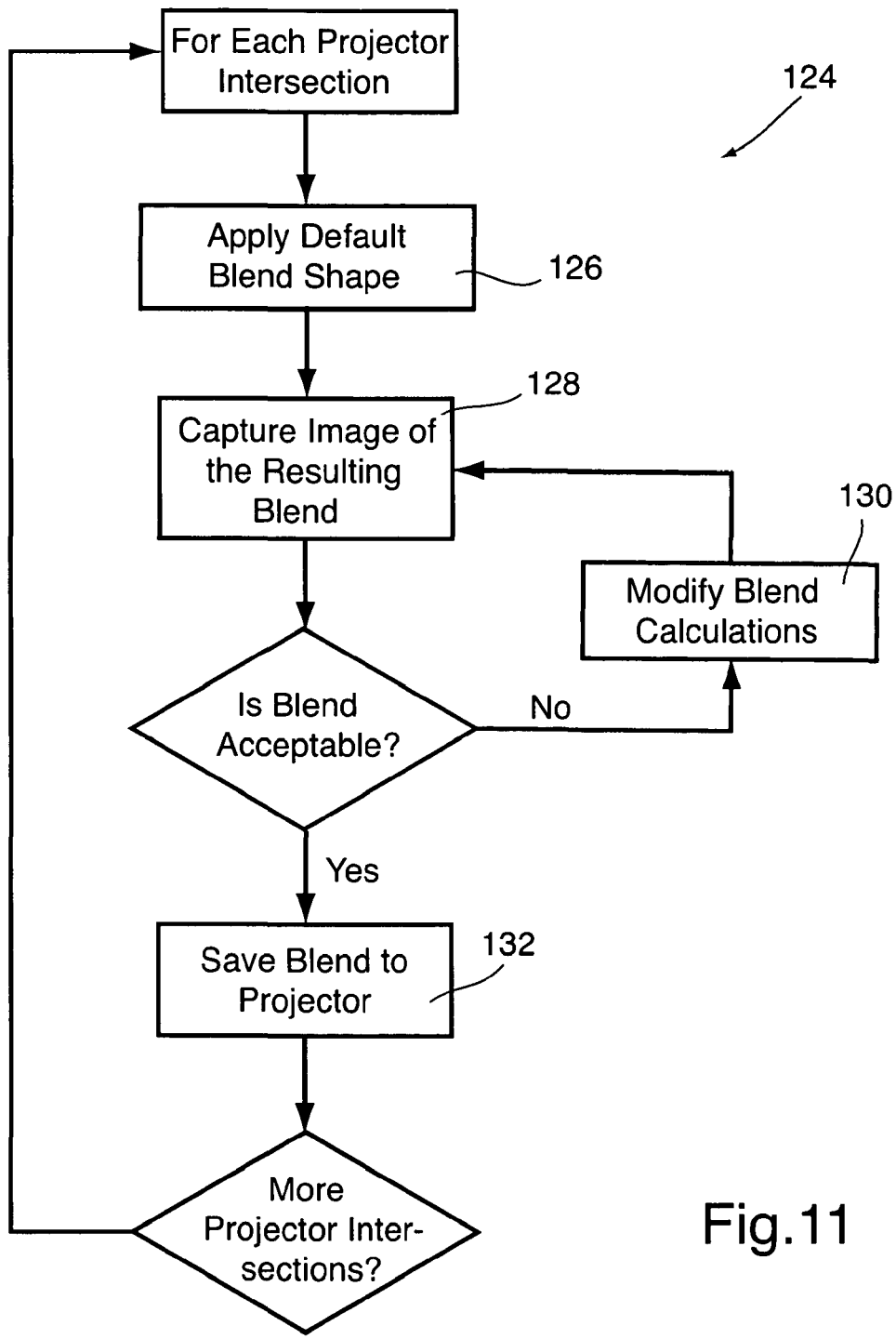
FIG. 11 is a flowchart showing a blending process for the multiple projector system of FIG. 2.

Once geometry, brightness, color and gamma corrections are applied, the overlap areas between the images projected by the respective projectors 16 are blended. The blending process includes the application of mechanical and/or electronic blinders. Generally, mechanical blinders typically perform better when darker scenes are projected and electronic blinders typically perform better when brighter scenes are projected. The electronic blinders are applied within the warping systems of the respective projectors 16. Referring to FIG. 11, for each projector intersection, or overlap area, a blending process 124 is performed. First, a default blending shape and intensity change is calculated, as indicated at block 126. The default blending shape and intensity change are calculated based on the geometry correction information that was previously determined. Then, at block 128, the blend is applied and an image is captured of the overlap area. If the blend is acceptable, the settings are saved in the projectors 16, as indicated at block 132. If the blend is not acceptable, an iterative blend calculation loop is entered and the blend calculations are modified at block 130. The process is repeated until the brightness across the entire overlap area is generally even.

Since mechanical blinders perform better for dark scenes, a system in which the blinders are placed and removed automatically may be used. Such a system is described in U.S. application Ser. No. 11/189,836, which was filed Jul. 27, 2005 and assigned to Christie Digital Systems Inc. For this type of system, the blending process 124 is performed both with and without blinders in place and both results are stored.

Referring back to FIG. 2, the dashed lines represent communication that occurs between the multiple projector system 10 and the calibration system 11 during the geometry calibration process of FIGS. 3, 6 and 7 and the color calibration process of FIGS. 8, 9 and 10. The solid lines shown represent communication that occurs during regular operation of the multiple projection system 10. As shown, the calibration system 11 is independent of the multiple projector system 10 and is not required once the multiple projection system 10 has been calibrated. Once the multiple projector system 10 has been calibrated, images from the image generator 12 are corrected in real time by the projectors 16. The calibration controller 22 and the camera 20 are selected so that the calibration system 11 is portable and thus may be taken to any number of different sites to perform calibration. This may result in significant cost savings for the user since it is not necessary to purchase the calibration system 11 in order to use the multiple projector system 10. The calibration system 11 may be borrowed or rented instead.

Figure 12:
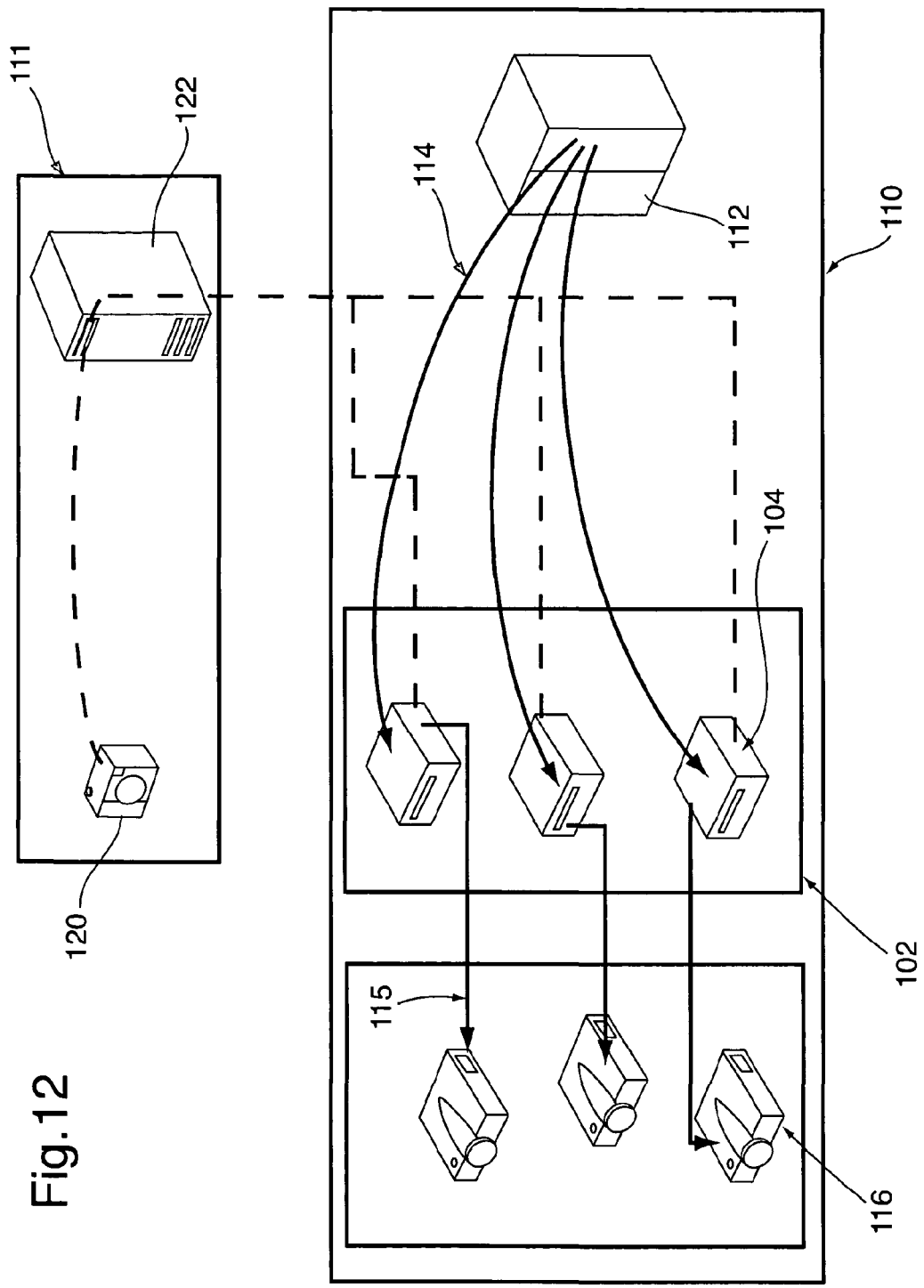
FIG. 12 is a schematic diagram of another embodiment of a multiple projector system.

Referring to FIG. 12, another embodiment of a multiple projection system 110 and a calibration system 111 is shown. The calibration system 111 includes a calibration controller 122 that receives images from a camera 120 and generates geometric calibration data color calibration data as has been previously described. The multiple projection system 110 includes an image generator 112 that provides image information for display on a display screen (not shown). The image information passes through video feed lines 114 to a warping system 102, which includes warping modules 104. The warping modules 104 alter the image information based on the calibration data and send the corrected image information to respective projectors 116 through a second set of video feed lines 115. Each projector 116 then projects a corrected image (not shown) on the display screen. Unlike the embodiment of FIG. 2, the projectors 116 do not include color modification and geometry manipulation functions. Instead, the projectors 116 are generic projectors not capable themselves of geometry correction, such as the Christie Matrix 3500, for example. This type of projector simply projects a pre-corrected image.

The multiple projection system 110 operates in a similar manner as the multiple projection system 10 of FIG. 2, however, the color modification and geometry manipulation is performed by the warping system 102 and corrected image data is sent to the projectors 116. The dashed lines of FIG. 11 represent communication that occurs during the calibration process defined in FIGS. 3 and 6 to 10 and the solid lines represent communication that occurs during regular operation of the multiple projection system 100. Similar to the previous embodiment, once the multiple projector system 110 has been calibrated, images from the image generator 112 are corrected in real time by the warping system 102.

Although the warping modules 104 are shown as individual units in FIG. 12, it will be appreciated that the warping system 102 may be manufactured as a single unit.

The calibration system of the present invention is not limited to use with projectors only. It will be appreciated by a person skilled in the art that any suitable image producing device may be used including a monitor, a display panel or a Liquid Crystal Display (LCD) screen, for example.

A specific embodiment of the present invention has been shown and described herein. However, modifications and variations may occur to those skilled in the art. All such modifications and variations are believed to be within the sphere and scope of the present invention.

What is claimed is:

1. A system comprising:
   a plurality of projectors;
   a camera for capturing images provided at a screen by the plurality of projectors; and,
   a computer for:
   implementing a calibration process comprising:
   capturing, using the camera, a projected image of a matrix of reference markers projected by the plurality of projectors on the screen;
   comparing locations of the reference markers in the projected image with target reference marker locations stored as a static geometrically correct image, the static geometrically correct image independent of any data captured by the camera; and,
   calculating new estimated locations for the reference markers;

iteratively repeating the calibration process until the reference markers are within a predetermined distance of the target reference marker locations to produce calibration data; and, communicating at least a portion of the calibration data to each of the plurality of projectors to correct further images to be projected on the screen.

2. The system of claim 1, wherein each of the plurality of projectors comprises a respective warping system for warping geometry of the projected image and the further images.

3. The system of claim 1, further comprising an image generator for providing at least the further images to the plurality of projectors.

4. The system of claim 1, wherein each of the plurality of projectors is further configured to map pixel locations in the further images to corrected pixel locations based on the calibration data, to correct the further images.

5. The system of claim 1, wherein the calibration data is provided in a lookup table.

6. The system of claim 1, wherein the calibration process further comprises one or more of: a color calibration process; an intensity matching process; and, a blending process for matching brightness in overlap areas of the images provided at the screen by each of the plurality of projectors.

7. A system comprising:
a plurality of projectors;
a camera for capturing images provided at a screen by the plurality of projectors; and,
a computer for:
implementing a calibration process comprising:
comparing a projected image at the screen with a static geometrically correct image, the projected image captured by the camera, the static geometrically correct image independent of any data captured by the camera; and,
correcting the projected image based on the comparing; and,
iteratively repeating the calibration process until features in the projected image are located within a predetermined distance of target feature locations in the static geometrically correct image; and,
generating calibration data for mapping further images to be projected on the screen onto the static geometrically correct image, each of the plurality of projectors for correcting the further images based on the calibration data.

8. The system of claim 7, wherein each of the plurality of projectors comprises a respective warping system for warping geometry of the projected image and the further images.

9. The system of claim 7, further comprising an image generator for providing at least the further images to the plurality of projectors.

10. The system of claim 7, wherein each of the plurality of projectors is further configured to map pixel locations in the further images to corrected pixel locations based on the calibration data, to correct the further images.

11. The system of claim 7, wherein the calibration data is provided in a lookup table.

12. The system of claim 7, wherein the calibration process further comprises one or more of: a color calibration process; an intensity matching process; and, a blending process for matching brightness in overlap areas of the images provided at the screen by each of the plurality of projectors.

13. A method comprising:
at a system comprising: plurality of projectors; a camera for capturing projected images provided at a screen by the plurality of projectors; and, a computer,
implementing, at the computer, a calibration process comprising:
capturing, using the camera, a projected image of a matrix of reference markers provided by the plurality of projectors at the screen;
comparing locations of the reference markers in the projected image with target reference marker locations stored as a static geometrically correct image, the static geometrically correct image independent of any data captured by the camera; and,
calculating new estimated locations for the reference markers;
iteratively repeating the calibration process until the reference markers are within a predetermined distance of the target reference marker locations to produce calibration data; and,
communicating at least a portion of the calibration data to each of the plurality of projectors to correct further images to be provided at the screen.

14. The method of claim 13, wherein the calibration process further comprises one or more of: a color calibration process; an intensity matching process; and, a blending process for matching brightness in overlap areas of the images provided at the screen by each of the plurality of projectors.

15. The method of claim 13, further comprising further mapping pixel locations in the further images to corrected pixel locations based on the calibration data, to correct the further images.

16. A method comprising:
at a system comprising: a plurality of projectors; a camera for capturing display images provided at a screen by the plurality of projectors; and, a computer,
implementing, at the computer, a calibration process comprising:
comparing a projected image at the screen with a static geometrically correct image, the projected image captured by the camera, the static geometrically correct image independent of any data captured by the camera; and,
correcting the projected image based on comparing; and,
iteratively repeating the calibration process until features in the projected image are located within a predetermined distance of target feature locations in the static geometrically correct image; and,
generating calibration data for mapping further images to be provided to the screen onto the static geometrically correct image, each of the plurality of projectors for correcting the further images based on the calibration data.

17. The method of claim 16, wherein the calibration process further comprises one or more of: a color calibration process; an intensity matching process; and, a blending process for matching brightness in overlap areas of the images provided at the screen by each of the plurality of projectors.

18. The method of claim 16, further comprising further mapping pixel locations in the further images to corrected pixel locations based on the calibration data, to correct the further images.

* * * * *